(12) United States Patent
Wu et al.

(10) Patent No.: US 8,280,957 B2
(45) Date of Patent: Oct. 2, 2012

(54) PRESENCE SYSTEM AND METHOD FOR EVENT-DRIVEN PRESENCE SUBSCRIPTION

(75) Inventors: Fuming Wu, Frisco, TX (US); Aziz Mohammed, Plano, TX (US)

(73) Assignee: Alcatel Lucent, Paris (FR)

(*) Notice: Subject to any disclaimer, the term of this patent is extended or adjusted under 35 U.S.C. 154(b) by 1091 days.

(21) Appl. No.: 11/021,576

(22) Filed: Dec. 23, 2004

(65) Prior Publication Data
US 2006/0143646 A1 Jun. 29, 2006

(51) Int. Cl.
G06F 15/16 (2006.01)
(52) U.S. Cl. .................................... 709/204
(58) Field of Classification Search .............. 709/204
See application file for complete search history.

(56) References Cited

U.S. PATENT DOCUMENTS

| | | | |
|---|---|---|---|
| 6,076,093 A | 6/2000 | Pickering | |
| 2003/0110228 A1* | 6/2003 | Xu et al. ............... | 709/207 |
| 2004/0037271 A1* | 2/2004 | Liscano et al. ......... | 370/352 |
| 2004/0062382 A1 | 4/2004 | Sylvain | |
| 2004/0062383 A1 | 4/2004 | Sylvain | |
| 2004/0122896 A1* | 6/2004 | Gourraud ............... | 709/204 |
| 2004/0153506 A1* | 8/2004 | Ito et al. ............... | 709/204 |
| 2004/0177119 A1* | 9/2004 | Mason et al. .......... | 709/206 |
| 2005/0071428 A1* | 3/2005 | Khakoo et al. ......... | 709/204 |
| 2005/0102389 A1* | 5/2005 | Liscano et al. ......... | 709/224 |
| 2006/0013233 A1* | 1/2006 | Trossen et al. ......... | 370/401 |
| 2007/0177119 A1* | 8/2007 | Chiba ................... | 355/53 |

FOREIGN PATENT DOCUMENTS

| | | |
|---|---|---|
| CN | 1282492 | 1/2001 |
| EP | 1610521 A1 * | 12/2005 |
| WO | 03096709 A2 | 11/2003 |

OTHER PUBLICATIONS

Day et al. "A Model for Presence and Instant Messaging." Request for Comments: 2778. Feb. 2000. Network Working Group. <http://www.ietf.org/rfc/rfc2778.txt>.*
Rosenberg et al., "Session Initiation Protocol (SIP) Extensions for Presence", Internet Engineering Task Force Internet Draft, May 20, 2002.*
U.S. Appl. No. 11/021,705, filed Dec. 23, 2005, Presence System and Method for Providing a Multi-Functional Communications Log.
FR0302264, Feb. 25, 2003, Device for the Management of Communications by the Selection of Terminals and the Communication Medium.
Office Action issued by the State Intellectual Property Office dated Sep. 5, 2008.
Office Action issued by European Patent Office dated Mar. 7, 2011.

* cited by examiner

*Primary Examiner* — William Goodchild
(74) *Attorney, Agent, or Firm* — Garlick & Markison; Holly L. Rudnick

(57) ABSTRACT

Automatic subscription to presence services is achieved using a communications manager within a presence system. The communications manager is capable of detecting the occurrence of an event associated with at least one of a presentity and a watcher. The communications manager automatically subscribes or unsubscribes the watcher to receive presence information of the presentity in response to detection of the event.

16 Claims, 2 Drawing Sheets

PRESENCE SYSTEM AND METHOD FOR EVENT-DRIVEN PRESENCE SUBSCRIPTION

BACKGROUND OF THE INVENTION

1. Technical Field of the Invention

The present invention relates in general to a presence-based interactive communications system, and in particular, to automating the subscription/unsubscription procedure of a watcher to monitor the presence of a presentity.

2. Description of Related Art

Presence-based interactive communication services are callee-centric, where callees (presentities) publish, in real time, their presence information (such as, the availability, activity, local time, location, current status of the active devices/applications and the corresponding preferences, etc.) to callers (presence watchers). The presence information is designed to enable the callers to more efficiently and effectively contact the callees. Existing presence-enabled applications utilize a presence subscription procedure that involves the direct interaction of users (i.e., the watcher and the presentity) through their respective clients/presence user agents via the corresponding proxy presence servers. Thus, presence services currently require asynchronous, on-line input of small pieces of data by both the presentity and the watcher.

The lack of automatic mechanisms for subscribing and unsubscribing to presence services imposes restrictions on the scope of available presence-enabled services. Since current presence services only provide real-time presence information of presentities to watchers, a watcher is not able to ascertain future presence information of a presentity unless the watcher subscribes to the presence service at a future point in time. This time-constraint on presence information may be undesirable in some applications.

For example, if a watcher is interested in knowing when a change in presence status of a presentity occurs, the watcher must either remain subscribed to the presence service indefinitely or predict when the change will occur. However, for the majority of applications, a watcher is not able to accurately predict a particular future point in time during which the presentites' presence information will indicate a desired presence status. As a result, the only option available to most watchers is to remain subscribed to the presence service, which leads to unnecessary network and other resources wastage.

Therefore, what is needed is a presence system and method for resolving the unpredictability property of future events. In addition, what is needed is an event-based presence subscription mechanism that achieves a significant reduction of network traffic and cost of presence services.

SUMMARY OF THE INVENTION

Embodiments of the present invention provide a communications manager for use within a presence system that is capable of detecting the occurrence of an event associated with at least one of a presentity and a watcher. The communications manager is further operable to automatically modify a status of a presence subscription of the watcher to receive presence information of the presentity in response to detection of the event.

In one embodiment, the communications manager detects the occurrence of an event based on the presence status of at least one of the presentity and the watcher. For example, the communications manager can monitor the occurrence of local events within the presence system to detect the particular event defined by the watcher. In another embodiment, the communications manager detects the occurrence of an event by receiving an event notification from an event service.

In a further embodiment, the communications manager stores watcher preferences defined by the watcher for modifying the status of the watcher's presence subscription to either subscribe or unsubscribe to the presence service based on the occurrence of the event. In addition, the watcher preferences can include subscription authorization information to enable the communications manager to modify the status of the presence subscription of the watcher with the watcher's presence server.

Advantageously, embodiments of the present invention resolve the future unpredictability issue for presence subscription. In addition, embodiments of the present invention reduce network traffic and cost by efficiently subscribing watchers based on events. Furthermore, embodiments of the present invention increase the scope of presence-enabled applications.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
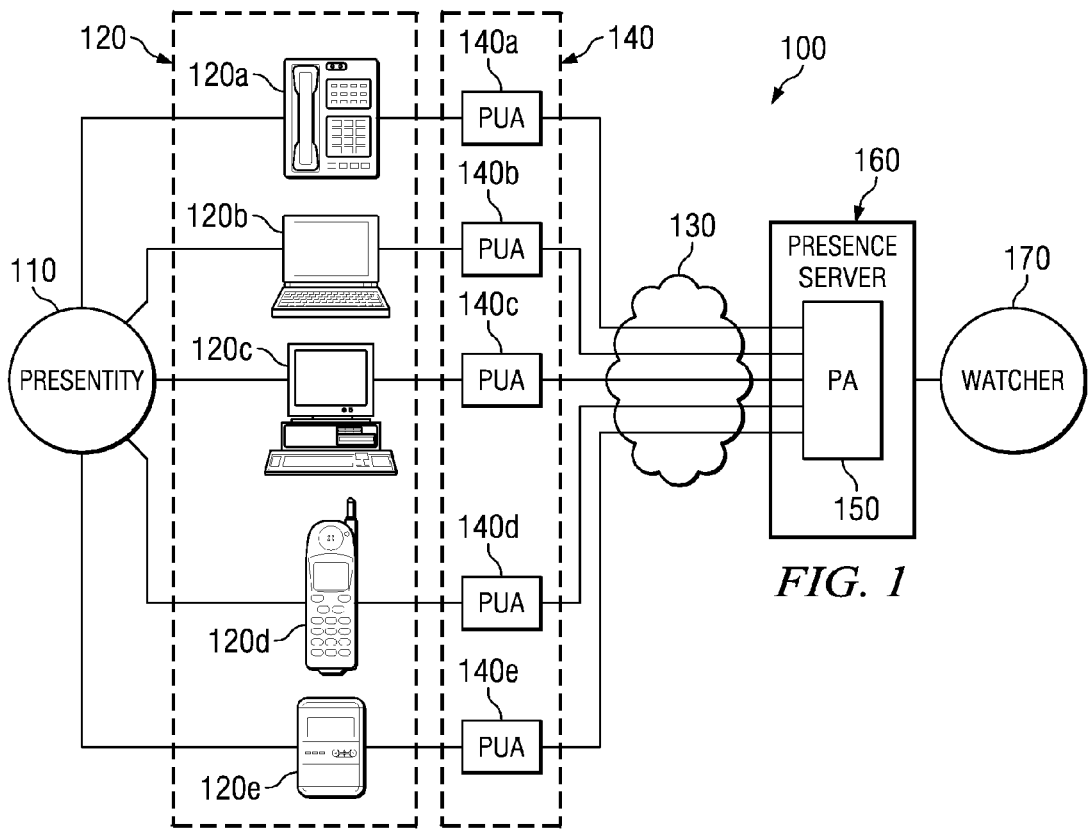
FIG. 1 illustrates an exemplary presence system for providing presence services, in accordance with embodiments of the present invention.

Referring to FIG. 1, there is illustrated an exemplary presence system 100 capable of implementing various embodiments of the present invention. The presence system 100 includes a presentity 110 and one or more devices 120 associated with the presentity 110. The presentity 110 represents the callee and provides presence information on the callee's presence status to the presence system 100. Each device 120 is a physical communications device capable of sending and/or receiving communications over a communications network 130. Examples of such devices 120 include, but are not limited to, a desktop phone 120*a*, a laptop computer 120*b*, a personal computer 120*c*, a cell phone 120*d* and a personal digital assistant (PDA) 120*e*. In FIG. 1, the communications network 130 represents any type of network over which media (circuit-switched or packet-switched voice or data) may be sent. For example, the communications network 130 can include the Public Switched Telephone Network (PSTN), Public Land Mobile Network (PLMN), one or more private local area networks (LANs), the Internet and/or any other type or combination of networks.

The presence system 100 further includes one or more presence user agents 140 (PUAs), a presence agent (PA) 150, a presence server 160 and one or more watchers 170 of the presentity 110. The PUAs 140 are capable of manipulating and providing presence information for the presentity 110. In FIG. 1, a separate PUA 140 is shown for each device 120.

However, it should be understood that in other embodiments, the number of PUAs 140 can vary based on the number and type of devices 120, the applications supported by the devices 120 and the system configuration. Each PUA 140 independently generates a component of the overall presence information for a presentity 110. Typically, PUA's 140 generate presence information when a change in presence status occurs. Examples of changes in presence status include, but are not limited to, turning on and off a device 120, modifying the registration from a device 120 and changing the instant messaging status on a device 120.

The presence information from each of the PUAs 140 is collected by one or more presence agents (PAs) 150. In FIG. 1, only one PA 150 is shown for simplicity. However, it should be understood that in other embodiments, there can be multiple PAs 150 for a presentity 110, each of which is responsible for a subset of the total subscriptions (requests for presence information from watchers 170) currently active for the presentity 110. The PA 150 maintains the current complete presence information for the presentity 110 and provides the presence information to one or more watchers 170 (callers) of the presentity 110. The presence server 160 is a physical entity that can operate as either the PA 150 or as a proxy server for routing requests from watchers 170 to the PA 150. Thus, the PA 150 in combination with the presence server 160, is operable to receive presence information of the presentity 110 from the PUAs 140, receive requests from watchers 170 for the presence information and provide the presence information to the watcher(s) 170. When acting as a PA 150, the presence server 160 can also be co-located with a PUA 140.

The presence system 100 uses a presence protocol to provide presence services to presentities 110 and watchers 170. An example of a presence protocol that can be used in the presence system 100 is the Session Initiation Protocol (SIP), as described in J. Rosenberg, et al., "SIP: Session Initiation Protocol" RFC: 3261, June 2002 and in A. Roach, et al., "Session Initiation Protocol (SIP)—Specific Event Notification," RFC: 3265, June 2002, each of which are hereby incorporated by reference. SIP is an application-layer control protocol used to create, modify and terminate communication (voice, text and/or multimedia) sessions. SIP can be used with other protocols, such as the Real-time Transport Protocol (RTP), the Real-Time Streaming Protocol (RTSP), the Session Description Protocol (SDP), the International Telecommunication Union—Telecommunications ("ITU-T") H.263 standard (video CODEC), the G.711 and G.729 standards (audio CODECs), and other or additional standards or protocols. As will be appreciated, other or additional protocols and configurations may be used.

SIP networks are capable of routing requests from any user on the network to the server that maintains the registration state for a user. Thus, SIP networks enable a caller (watcher) to transmit a SUBSCRIBE request for presence information relating to a particular callee (presentity 110) to be routed to the presence server 160 that maintains the presence information for the presentity 110. In operation, the presence server 160 and PA 150 may be co-located with the SIP proxy/registrar for efficiency purposes.

Figure 2:
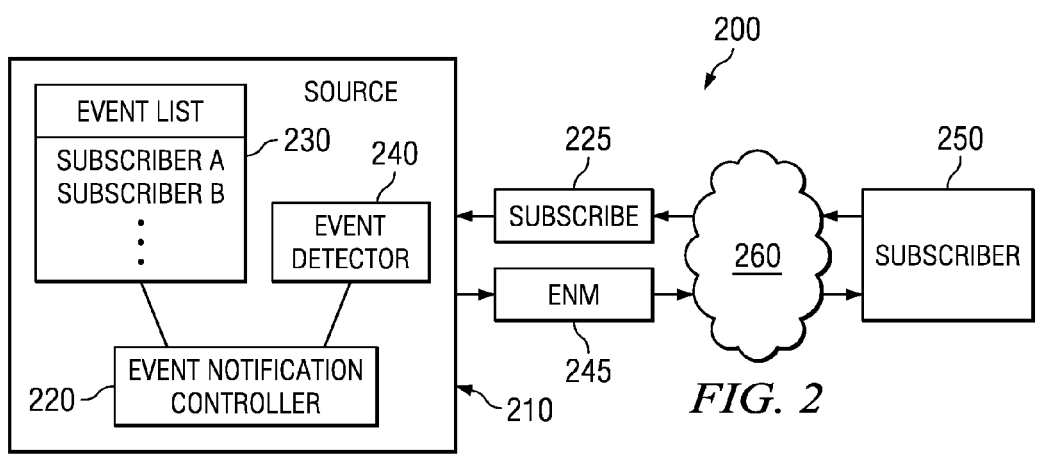
FIG. 2 is a block diagram illustrating an exemplary event system for providing event services, in accordance with embodiments of the present invention.

FIG. 2 is a block diagram illustrating an exemplary event system 200 for providing event services, in accordance with embodiments of the present invention. In general, event services enable an entity of interest (e.g., source 210) to advertise (e.g., by e-mail, web pop-up advertisements, voice, fax or other advertising means) the event services they want to provide to interested parties (e.g., subscriber 250). For example, each event service can correspond to a particular type of event (e.g., sports scores, stock quotes, news and other information). The subscribers 250 specify the events they are interested in by subscribing to one or more event services provided by the source 210.

The source 210 maintains a list 230 of subscribers subscribing to a particular event service. The list 230 can include subscribers 250 that have specifically subscribed to receive event notification messages 245 (e.g., sent a subscribe message 225 to the source 210), subscribers 250 that have not opted out of the event service and/or subscribers 250 that have shown an interest in the type of information included in the event notification messages 245. The source 210 further includes an event detector 240 operable to detect the occurrence of an event and trigger an event notification controller 220 to create an event notification message 245 for each subscriber 250 on the list 230 that has subscribed to the event service. As used herein, the term "controller" means any device, system or part thereof that controls at least one operation, which can be implemented in hardware, software, firmware, or some combination of the above. It should be noted that the functionality associated with the controller may be centralized or distributed, whether locally or remotely.

The source 210 publishes event notification messages 245 and delivers the event notification messages 245 to the subscriber(s) 250 via a communications network 260 (e.g., PSTN, PLMN, LAN, the Internet and/or any other type or combination of networks). For example, the source 210 can transmit the event notification message 245 via e-mail, instant message, text message, voice message, facsimile or other type of message delivery system.

Figure 3:
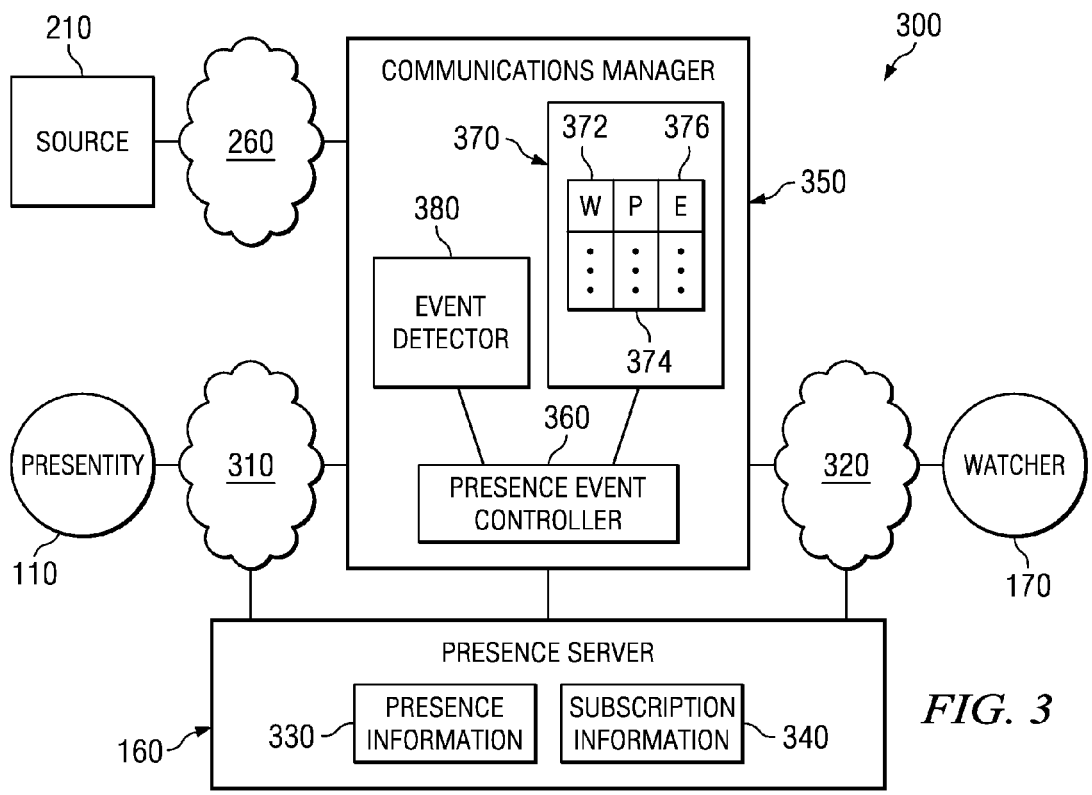
FIG. 3 illustrates an exemplary presence system incorporating event services to provide event-driven presence subscription, in accordance with embodiments of the present invention.

FIG. 3 is a block diagram illustrating an exemplary presence system 300 incorporating event services to provide event-driven presence subscription, in accordance with embodiments of the present invention. Event services can be characterized as being discrete in time, while presence services can be characterized as being continuous over time. As a result, event services create limited traffic in network and, thus, the cost of subscriptions for event services are much cheaper than that of presence services, which may consume a lot of network resources. Therefore, combining presence services with event services reduces the traffic in the presence system and reduces the cost of deploying presence services. In addition, such an operation broadens the application of presence based systems beyond the current definition of presence information, i.e., the presence can be generalized into any event of interest.

To combine presence services with event services, a communications manager 350 is provided that is designed as a client supporting both event services and presence services. The communications manager 350 includes a presence event controller 360, a memory 370 and an event detector 380. The memory 370 is configured to store watcher information 372, presentity information 374 and event information 376. The watcher information 372 can include, for example, watcher identities identifying each watcher 170 subscribed to the presence/event service. In addition, the watcher information 372 can include watcher preferences defined by the watcher 170.

For example, in one embodiment, the watcher preferences may instruct the communications manager 350 to subscribe the watcher 170 to presence services upon the detection of an event. In another embodiment, the watcher preferences may instruct the communications manager 350 to unsubscribe the watcher to presence information of a presentity upon the detection of an event. In a further embodiment, the watcher preferences may include subscription authorization information to enable the communications manager 350 to subscribe/unsubscribe the watcher 170 to presence information of a presentity. For example, the subscription authorization information can include a user identifier (uri) and password of the watcher 170, a presence server address of a presence server 160 associated with the watcher 170 and presence filtering information specifying the particular presence information 330 to be provided to the watcher 170.

The presentity information 374 can be associated with a particular watcher identity, and can include, for example, one or more presentity identities identifying presentities 110 the watcher 170 is interested in monitoring. Each presentity identity can further be associated with event information 376, including an event description identifying the particular event(s) that trigger the communications manager 350 to subscribe/unsubscribe the watcher 170 to presence services.

In one embodiment, the event information 376 can define a particular event associated with a presentity 110 which triggers the communications manager 350 to modify the status of the presence subscription (e.g., change from subscribed to unsubscribed or from unsubscribed to subscribed) of the watcher 170. For example, the watcher 170 may want to subscribe to presence services to receive presence information 330 of the presentity 110 when the presentity logs-on to the network or to a particular device. As another example, the watcher 170 may want to unsubscribe to presence services to no longer receive presence information 330 of the presentity 110 when the presentity logs-off from the network or a particular device.

In another embodiment, the event information 376 can define a particular event associated with the watcher 170 which triggers the communications manager 350 to modify the status of the watcher's presence subscription. For example, the watcher 170 may want to subscribe to presence services to receive presence information 330 of the presentity when the watcher 170 logs-on to the network or to a particular device. As another example, the watcher 170 may want to unsubscribe to presence services to no longer receive presence information 330 of the presentity 110 when the watcher 170 logs-off from the network or a particular device.

In addition, the event information 376 can define either events that are captured and transmitted by means of event notification messages in existing event services systems and/or events that are observed locally in a user's communications environment. In the former case, triggering based on event notification messages enables the communications manager 350 to modify the status of the watcher's presence subscription even when the presentity 110 is remotely located (e.g., roaming in another communications network).

It should be understood that the memory 110 includes any type of data storage device, including but not limited to, a hard drive, random access memory (RAM), read only memory (ROM), compact disc, floppy disc, ZIP® drive, tape drive, database or other type of storage device or storage medium.

The event detector 380 is capable of detecting the occurrence of an event specified in the event information 376 and trigger the presence event controller 360 to modify the status of the presence subscription of the watcher 170 based on the watcher information 372. The presence subscription of the watcher 170 is stored in the presence server 160 as subscription information 340, and indicates whether the watcher 170 is either subscribed to receive presence information 330 of the presentity 110 or unsubscribed to not receive presence information 330 of the presentity 110.

In one embodiment, the event detector 380 interfaces with an event system to precisely express, by means of the correctness of subscription semantics, to the event system, the events the communications manager 350 wants to subscribe to. The event detector 380 is further capable of receiving event notification messages from the source 210 of the event information via the event communication network 260. Upon receipt of the event notification message, the event detector 380 triggers the presence event controller 360 to modify the status of the watcher's presence subscription in the subscription information 340 stored in the presence server 160 based on the watcher preferences stored in the memory 370.

In another embodiment, the event detector 380 captures the occurrences of local events of interest associated with the presentity 110, the watcher 170 or both the presentity 110 and the watcher 170. Examples of local events of interest include, but are not limited to, e-mail arrival, communication attempts for both out-band and in-band sessions, or the reachability of the watcher and/or presentity to some specific applications (e.g., such as a 'log-on' event). For example, the event detector 380 can interface with the presence server 160 to monitor the presence status of the presentity 110 and/or the watcher 170 using the presence information 330 collected by the presence server 160. Upon the detection of a local event of interest (as specified in the event information 376), the event detector 380 triggers the presence event controller 360 to modify the status of the watcher's presence subscription in the subscription information 340 stored in the presence server 160 based on the watcher preferences stored in the memory 370.

The presence event controller 360 is operable to map events detected by the event detector 380 to presence subscribing/unsubscribing actions using information 372, 374 and 376 stored in the memory 370. The presence event controller 360 automatically (e.g. without user input) performs the subscription/unsubscription of the other parties' (the presentities 110, in connection with presence services) presence on behalf of the user (the watcher, in connection with presence services) upon receiving the event notification message or observing the local stimulating event triggering the subscription/unsubscription activity. The presence event controller 360 communicates with the presence server 160 to automatically modify the status of the presence subscription of the watcher 170 to presence information 330 of the presentity 110, as indicated in the subscription information 340 stored in the presence server 160. In addition, the presence event controller 360 communicates with the presence server 160 to monitor the presence status of the presentity 110 and/or watcher 170 to enable the event detector 380 to detect the occurrence of an event specified in the event information 376.

The presence event controller 360 is further operable to monitor events associated with the presentity 110 via communication network 310, and to monitor events associated with the watcher 170 via communication network 320. Communication networks 310 and 320 include any type of network, such as PSTN, PLMN, LAN, Internet or other type of network. In addition, communication networks 310 can be the same communication network or different communication networks (e.g., with a remote presentity 110).

Once the watcher's presence subscription status is automatically modified in the subscription information 340 in the presence server 160, the presence server 160 operates to provide presence services to the watcher 170 based on the presence subscription status. For example, if the communications manager 350 modifies the status of the watcher's presence subscription from unsubscribe to subscribe, the presence server 160 provides the presence information 330 of the presentity 110 to the watcher 170. As another example, if the communications manager 350 modifies the status of the watcher's presence subscription from subscribe to unsubscribe, the presence server 160 discontinues providing the presence information 330 of the presentity 110 to the watcher 170. The presence event controller 360 can use the subscription authorization information (e.g., uri, password, proxy (presence server) address, presence filtering, etc.) provided by the watcher and stored in the watcher information 373 in the memory 370 to modify the status of the presence subscription of the watcher 170 in the presence server 160.

It should be noted that the communications manager 350 may be constructed or configured using hardware, software, firmware, or combination thereof for detecting events and modifying the status of a watcher's presence subscription to presence information of a presentity. As an example, the communications manager 350 could include one or more processors that execute instructions and one or more memories that store instructions and data used by the processors. The processor is generally understood to be a device that drives a general-purpose computer. It is noted, however, that other processor devices such as microcontrollers, Field Programmable Gate Arrays (FPGAs), or Application Specific Integrated Circuits (ASICs), or a combination thereof, can be used as well and achieve the benefits and advantages described herein.

In one embodiment, the communications manager 350 can include one or more processes, such as software applications providing an activity, a function, or a systematic sequence of tasks that produces a specified result. For example, the communications manager 350 can be an application running on the presence server 160 or on a different node in the presence system.

Figure 4:
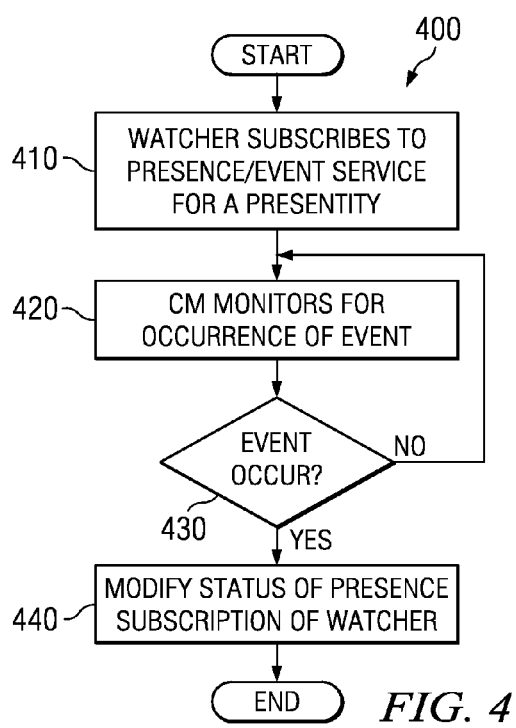
FIG. 4 is a flowchart illustrating an exemplary process for event-driven presence subscription, in accordance with embodiments of the present invention.

FIG. 4 is a flowchart illustrating an exemplary process for event-driven presence subscription, in accordance with embodiments of the present invention. Initially, at block 410, a watcher subscribes to the presence/event service with the communications manager to modify the status of the watcher's presence subscription for presence information of a presentity based on the occurrence of one or more events. The watcher may define his/her preferences when subscribing to the presence/event service. For example, the subscriber may prefer to subscribe or unsubscribe to presence services of the presentity upon the detection of an event. The event can be associated with the watcher, the presentity or both. In addition, the event can be associated with the receipt of an event notification message or a locally-observed event.

At block 420, the communications manager monitors for the occurrence of the event specified by the watcher. If the communications manager detects the occurrence of the event at block 430, the communications manager interfaces with the presence server to modify the status of the presence subscription of the watcher based on the watcher preferences (e.g., subscribe/unsubscribe) at block 440. Once the watcher's presence subscription status is modified in the presence server, the presence server provides presence services to the watcher based on the current presence subscription status.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

We claim:

1. A communications manager within a presence system maintaining presence information on a plurality of presentities and subscription information for a plurality of watchers of said presentities, said communications manager comprising:
   an event detector capable of detecting the occurrence of an event associated with a watcher of a presentity, the event not being associated with any of said presentities;
   a controller operable to automatically modify a status of a presence subscription of said watcher by subscribing or unsubscribing said watcher to receive presence information of said presentity in response to detection of said event, said presence system not maintaining said presence information of said presentity for said watcher while said watcher is unsubscribed to receive said presence information of said presentity; and
   a memory for storing watcher preferences including subscription authorization information to enable said controller to modify said status of said presence subscription of said watcher, said subscription authorization information including a user identifier and password of said watcher, a presence server address and presence filtering information specifying portions of said presence information of said presentity to be provided to said watcher.

2. The communications manager of claim 1, wherein the memory further stores a watcher identity identifying said watcher and an event description identifying said event.

3. The communications manager of claim 2, wherein said memory further includes a presentity identity identifying said presentity, and said event detector is operable to monitor a presence status of said watcher to detect the occurrence of said event.

4. The communications manager of claim 2, wherein said event detector is capable of receiving an event notification from an event service indicating the occurrence of said event.

5. The communications manager of claim 1, wherein said watcher preferences further include modifying said status of said presence subscription to subscribe to receive said presence information of said presentity.

6. The communications manager of claim 1, wherein said watcher preferences further include modifying said status of said presence subscription to unsubscribe to not receive said presence information of said presentity.

7. A presence system for event-driven presence subscription, comprising:
   a presence server capable of receiving and storing presence information for a plurality of presentities and subscription information for a plurality of watchers of said presentities; and
   a communications manager capable of detecting the occurrence of an event associated with a watcher, the event not being associated with any of said presentities, wherein said communications manager is operable to automatically modify a status of a presence subscription of said watcher by subscribing or unsubscribing said watcher to receive presence information of a presentity in said subscription information in response to detection of said event;
   wherein said presence server does not maintain said presence information of said presentity for said watcher while said watcher is unsubscribed to receive said presence information of said presentity; and
   wherein said communications manager is operable to modify said status of said presence subscription of said watcher based on watcher preferences including subscription authorization information defined by said watcher, said subscription authorization information including a user identifier and password of said watcher, a presence server address for said presence server and presence filtering information specifying portions of said presence information of said presentity to be provided to said watcher.

8. The presence system of claim 7, wherein said watcher preferences include modifying said status of said presence subscription to subscribe to receive said presence information of said presentity.

9. The presence system of claim 7, wherein said watcher preferences include modifying said status of said presence subscription to unsubscribe to not receive said presence information of said presentity.

10. The presence system of claim 7, wherein said communications manager is operable to monitor a presence status of said watcher to detect the occurrence of said event.

11. The presence system of claim 7, wherein said communications manager is capable of receiving an event notification from an event service indicating the occurrence of said event.

12. A method for event-driven presence subscription, comprising the steps of: detecting the occurrence of an event associated with a watcher of a presentity, the event not being associated with any of a plurality of presentities; and automatically modifying a status of a presence subscription of said watcher by subscribing or unsubscribing said watcher to receive presence information of said presentity in response to detection of said event, said presence information of said presentity not being maintained for said watcher while said watcher is unsubscribed to receive said presence information of said presentity;

wherein said status of said presence subscription of said watcher is automatically modified based on watcher preferences including subscription authorization information defined by said watcher, said subscription authorization information including a user identifier and password of said watcher, a presence server address and presence filtering information specifying portions of said presence information of said presentity to be provided to said watcher.

13. The method of claim 12, wherein said step of automatically modifying said status of said presence subscription further includes automatically modifying said status of said presence subscription of said watcher based on said watcher preferences to either subscribe to receive said presence information of said presentity or to unsubscribe to not receive said presence information of said presentity.

14. The method of claim 12, wherein said step of detecting the occurrence of said event further includes monitor a presence status of said watcher to detect the occurrence of said event.

15. The method of claim 12, wherein said step of detecting the occurrence of said event further includes receiving an event notification from an event service indicating the occurrence of said event.

16. A presence system for event-driven presence subscription, comprising: a presence server coupled to receive and store presence information for a plurality of presentities and subscription information for a plurality of watchers of said presentities; and a communications manager coupled to receive an unsolicited event notification from an event service outside of said presence system indicating the occurrence of an event unrelated to presence, wherein said communications manager is operable to automatically modify a status of a presence subscription of a watcher for receiving presence information of a presentity in said subscription information in response to occurrence of said event;

wherein said communications manager is operable to modify said status of said presence subscription of said watcher based on watcher preferences including subscription authorization information defined by said watcher, said subscription authorization information including a user identifier and password of said watcher, a presence server address for said presence server and presence filtering information specifying portions of said presence information of said presentity to be provided to said watcher.

* * * * *